United States Patent
Lee

(10) Patent No.: US 10,415,726 B2
(45) Date of Patent: Sep. 17, 2019

(54) SEALING MEMBER HAVING PROJECTION PART FOR PIPE CONNECTION

(71) Applicant: JUNGWOO METAL IND. CO., LTD., Gyeonggi-do (KR)

(72) Inventor: Kwang Won Lee, Gyeonggi-do (KR)

(73) Assignee: JUNGWOO METAL IND. CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/901,918

(22) PCT Filed: Aug. 27, 2015

(86) PCT No.: PCT/KR2015/008997
§ 371 (c)(1),
(2) Date: Dec. 29, 2015

(87) PCT Pub. No.: WO2016/036057
PCT Pub. Date: Mar. 10, 2016

(65) Prior Publication Data
US 2018/0156365 A1    Jun. 7, 2018

(30) Foreign Application Priority Data
Sep. 4, 2014    (KR) .......................... 10-2014-0117820

(51) Int. Cl.
*F16L 17/025*    (2006.01)
*F16L 17/02*    (2006.01)
(Continued)

(52) U.S. Cl.
CPC ............. *F16L 17/025* (2013.01); *F16L 13/14* (2013.01); *F16L 13/142* (2013.01); *F16L 17/02* (2013.01); *F16L 17/06* (2013.01); *F16L 13/148* (2013.01)

(58) Field of Classification Search
CPC ... F16J 9/00; F16J 15/00; F16L 17/025; F16L 17/02; F16L 13/14; F16L 13/142; F16L 13/148; F16L 17/06
(Continued)

(56) References Cited

U.S. PATENT DOCUMENTS 2,032,492 A * 3/1936 Nathan ................. F16L 17/025
                                                          277/605
2,501,943 A * 3/1950 Jack ...................... F16L 17/025
                                                          277/607
(Continued)

FOREIGN PATENT DOCUMENTS

JP    2000320754    11/2000
JP    2005291260    10/2005
(Continued)

OTHER PUBLICATIONS

International Search Report cited in PCT Application No. PCT/KR2015/008997 dated Dec. 1, 2015.

*Primary Examiner* — Nathan Cumar
(74) *Attorney, Agent, or Firm* — Workman Nydegger

(57) ABSTRACT

Provided is a pipe connecting sealing member including a projection part includes a body part that is provided between the outer surface of the pipe and the inner surface of the connector to which the pipe is inserted, and is formed to extend in a ring shape along a circumferential direction; and the projection part that is formed in a spiral shape forming an unlimited orbit and projects along the outer surface of the body part.

14 Claims, 3 Drawing Sheets

(51) Int. Cl.
 *F16L 13/14* (2006.01)
 *F16L 17/06* (2006.01)
(58) Field of Classification Search
 USPC .......................................................... 277/602
 See application file for complete search history.

(56) References Cited

U.S. PATENT DOCUMENTS

| | | | | |
|---|---|---|---|---|
| 6,264,206 | B1 * | 7/2001 | Hashizawa | ............ F16J 15/061 |
| | | | | 277/641 |
| 8,783,694 | B2 * | 7/2014 | Matsuo | .................. F16J 15/106 |
| | | | | 277/637 |

FOREIGN PATENT DOCUMENTS

| KR | 200198054 | 10/2000 |
|---|---|---|
| KR | 100974605 | 8/2010 |
| KR | 101212470 | 12/2012 |

\* cited by examiner

[Fig. 1]
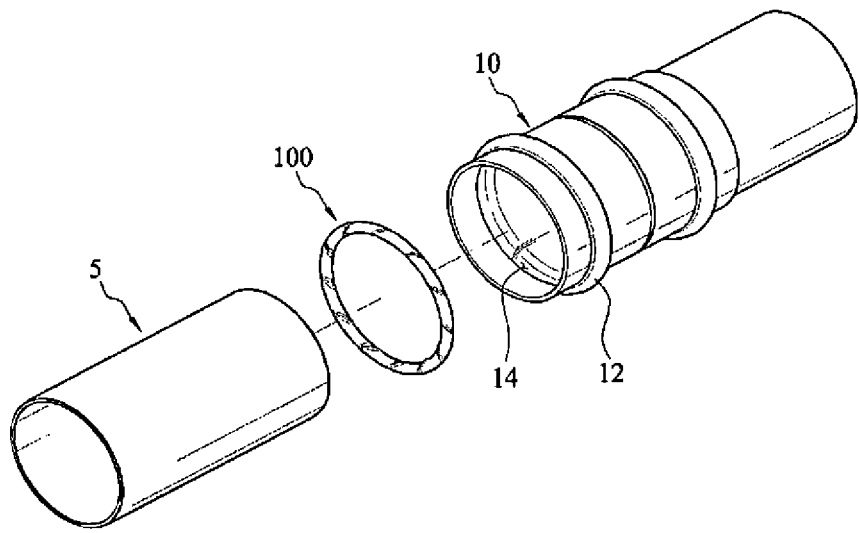
[Fig. 2]
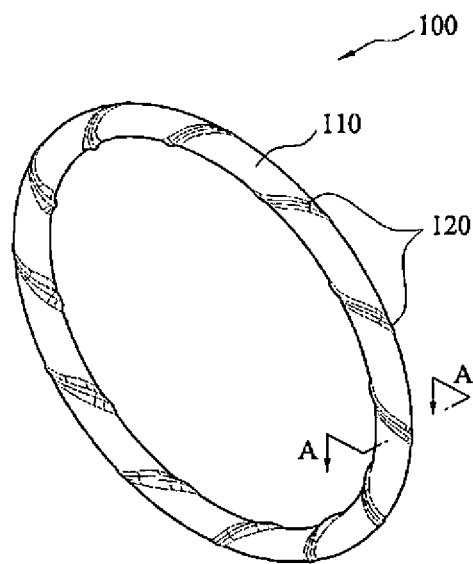
[Fig. 3]
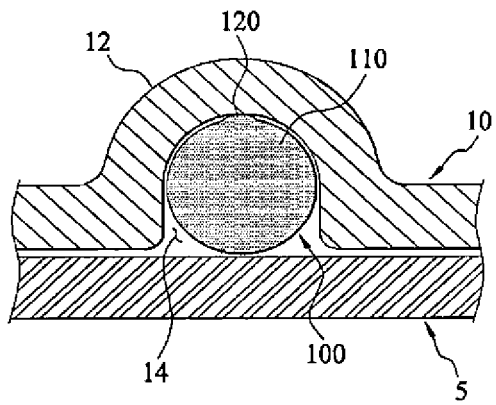

[Fig. 4]
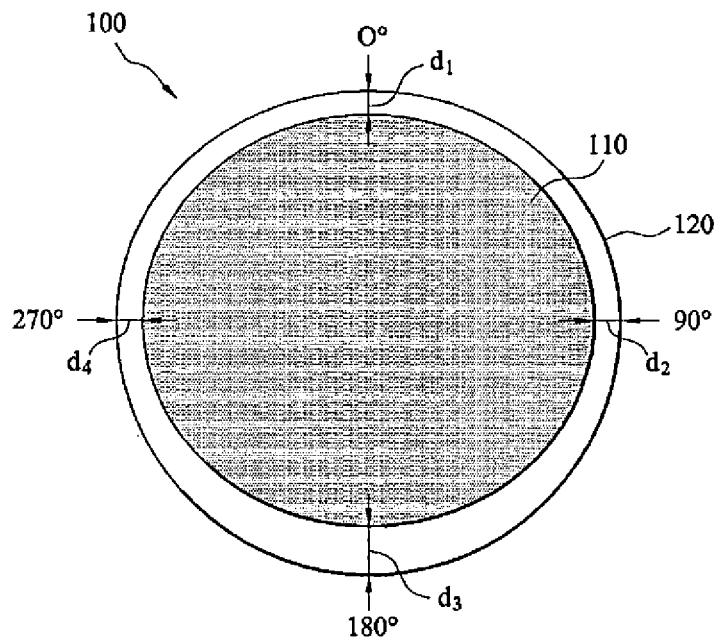
[Fig. 5]
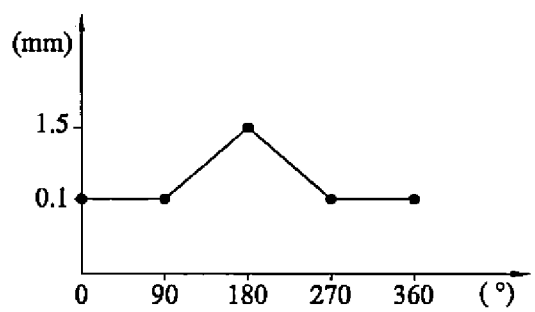
[Fig. 6]
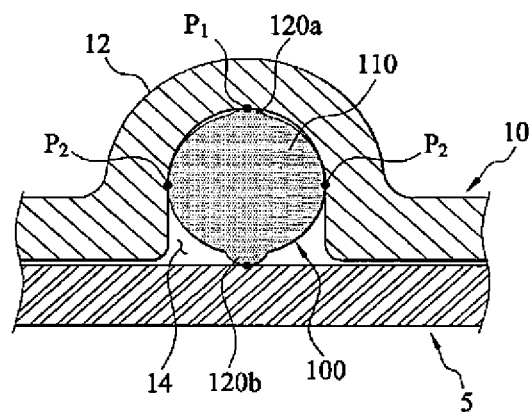

[Fig. 7]
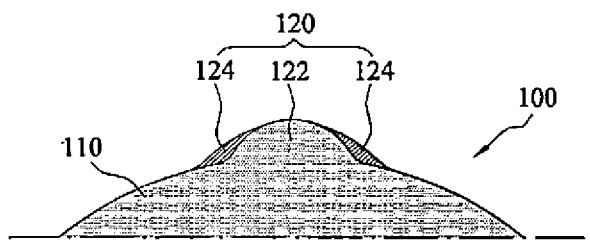
[Fig. 8]
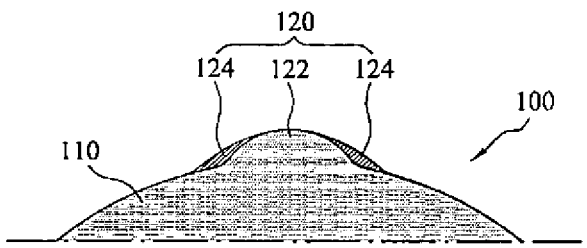
[Fig. 9]
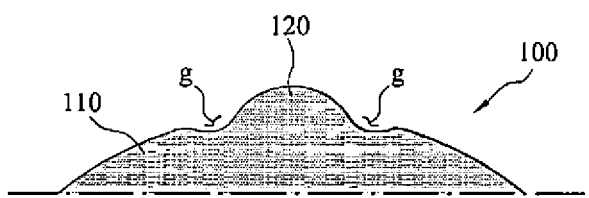

SEALING MEMBER HAVING PROJECTION PART FOR PIPE CONNECTION

CROSS-REFERENCES TO RELATED APPLICATION

This application claims priority of Korean Patent Application No. KR10-2014-0117820, filed on Sep. 4, 2014, in the Korean Intellectual Property Office, which is hereby incorporated by reference in its entirety.

BACKGROUND OF THE INVENTION

Field of the Invention

The present invention relates to a pipe connecting sealing member, and more particularly, to a pipe connecting sealing member that is formed with a spiral protrusion to allow significant improvement in index force.

Description of the Related Art

In general, pipe connection tools are used to connect various types of pipes constructed in architecture and civil engineering fields, and such pipe connection tools are formed in various forms, depending on the size and type of pipes.

In the case of a large-diameter pipe connection tool, a housing space is formed inside the connector in which the pipe is inserted, and an index ring and a grip ring are provided in the housing space. Thus, after inserting the pipe inside the connector, by crimping the grip ring to penetrate an outer surface of the pipe, the pipe is fixed.

In the case of a small-diameter pipe connection tool, a method of inserting and connecting the pipe after insertion of the index ring in a groove formed along an inner periphery of the connector into which the pipe is inserted, is used. In this case, the index ring compresses the outer surface of the pipe, thereby preventing leakage of fluid flowing in the inside of the pipe.

However, since the index ring used in the conventional small-diameter pipe connection tool is formed in a simple ring shape, when the inner surface is not formed in a perfect circular shape, it is difficult to obtain the effect of the full index. That is, although the processing of index ring needs to be very precisely performed, the inner surface of the index ring is hard to achieve a complete circular shape due to realistic limits on the manufacturing process, and there is a problem of the increase in quality variation.

In addition, since the continual friction is applied only to the inner surface of the index ring due to the taking in and out of the pipe in the course of that connection, there is also the problem in which wearing easily occurs.

Therefore, methods for solving these problems are required.

SUMMARY OF THE INVENTION

The present invention has been devised to solve the problems of the above-described prior art, and an aspect of the present invention is directed to provide a pipe connecting sealing member that dramatically improves the index power.

Another aspect of the present invention is directed to a pipe connecting sealing member that minimizes the occurrence of wearing to significantly enhance the life expectancy.

The aspects of the present invention are not limited to those mentioned above, and other problems that have not been mentioned will clearly be understood by those skilled in the art from the following description.

According to an aspect of the present invention, there is a pipe connecting sealing member provided that includes a body part that is provided between an outer surface of the pipe and an inner surface of a connector to which the pipe is inserted, and is formed to extend in a ring shape along a circumferential direction; and a projection part that is formed in a spiral shape forming an unlimited orbit and projects along an outer surface of the body part.

A cross-section of the body part may be formed in a circular shape.

In addition, the projection part may be configured so that at least an inner end protrudes higher than an outer end.

Further, the projection part may be formed so that a projection height gradually increases as it goes from both ends to the inner end.

Further, the projection part may be formed so that a height from both ends to the outer end is uniform.

Also, the outer surface of the projection part may be formed to have a curvature greater than that of the body part.

Further, the projection part may include a central center region, and a connecting region that is formed on both sides of the center region to connect the projection part and the body part.

The outer surface of the connecting region may be formed to have a curvature that is smaller than the curvature of the center region and is greater than the curvature of the body part.

The pipe connecting sealing member including the projection part of the present invention for solving the above-described problems has the following effects.

First, since a spiral projection part is formed along the entire circumference of the sealing member, there is an advantage capable of dramatically improving the index force.

Second, since a contact area with the pipe is very small, there are advantages in that there is no need to form the inner surface of the sealing member in a complete circular shape, and it is possible to reduce the burden on the precision processing, and a variation in quality hardly occurs.

Third, since the contact surface with the pipe is extremely small, there is an advantage capable of minimizing occurrence of wearing due to friction.

The effects of the present invention are not limited to the above-mentioned effects, and other effects that have not been mentioned will be able to be clearly understood from the scope of the claims to those skilled in the art.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 1 is a perspective view illustrating an aspect of the connecting using a connector equipped with a sealing member according to an embodiment of the present invention;

FIG. 2 is a perspective view illustrating an aspect of the sealing member according to an embodiment of the present invention;

FIG. 3 is a cross-sectional view illustrating a section taken along line A-A in a state in which the sealing member according to an embodiment of the present invention is inserted into the connector;

FIG. 4 is a perspective view illustrating a height corresponding to the position of the projection part in the sealing member according to an embodiment of the present invention;

FIG. 5 is a graph illustrating a change in height corresponding to the position of the protrusion part in the sealing member according to an embodiment of the present invention;

FIG. 6 is a cross-sectional view illustrating an outer end and an inner end shape of the projection part at the same time in the sealing member according to an embodiment of the present invention;

FIG. 7 is a cross-sectional view illustrating a state of the projection part in the sealing member according to an embodiment of the present invention;

FIG. 8 is a cross-sectional view illustrating a state in which the projection part is deformed by being compressed, in the sealing member according to an embodiment of the present invention; and FIG. 9 is a cross-sectional view illustrating a projection part that does not include a connecting region.

DETAILED DESCRIPTION OF EXEMPLARY EMBODIMENTS

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

Hereinafter, a preferred embodiment of the present invention in which an object of the present invention can be specifically achieved will be described with reference to the accompanying drawings. In describing the present embodiment, the same names and the same reference numerals are used in the same configurations, and an additional description thereof will be omitted.

FIG. 1 is a perspective view illustrating a state which connects a pipe 5, using a connector 10 equipped with a sealing member 100 according to an embodiment of the present invention.

As illustrated in FIG. 1, the sealing member 100 is provided inside of the connector 10 for connecting the pipe 5. Further, upon insertion of the pipe 5 on the inside of the connector 10, the sealing member 100 prevents leakage of the fluid that flows inside the pipe 5.

At this time, in this embodiment, the connector 10 is formed with a large-diameter section 12 larger than other sections, and a housing groove 14 in which the sealing member 100 is housed is formed on the inside of the large-diameter section 12. That is, the sealing member 100 according to the present invention simultaneously compresses the pipe 5 and the inner surface of the large-diameter section 12 in a state of being inserted into the housing groove 14, thereby performing the index function.

Hereinafter, the sealing member 100 of the present invention as described above will be described in detail.

FIG. 2 is a perspective view illustrating a state of the sealing member 100 according to an embodiment of the present invention.

As illustrated in FIG. 2, the sealing member 100 according to an embodiment of the present invention includes a body part 110, and a projection part 120.

As described above, the body part 110 is provided between the outer surface of the pipe and the inner surface of the connector to which the pipe is inserted, and is formed to extend in the circumferential direction. That is, the body part 110 is formed in an entirely ring shape.

Further, in the case of this embodiment, the cross-section of the body part 110 is formed in a circular shape, and is formed to have an entirely uniform cross-sectional area.

The projection part 120 is formed in a spiral shape constituting an endless orbit, and has a form that protrudes along the outer surface of the body part 110.

That is, the projection part 120 has a form that is integrally connected over the entire circumference of the body part 110, and goes through the inside and outside of the body part 110 for each predetermined distance. At this time, a period of the helix may be set to various lengths depending on the design.

FIG. 3 is a cross-sectional view illustrating a cross-section taken from line A-A in a state in which the sealing member 100 according to an embodiment of the present invention is inserted inside the connector 10.

As illustrated in FIG. 3, in a state in which the sealing member 100 according to an embodiment of the present invention is housed in the housing groove 14 of the connector 10, the projection part 120 comes into contact with the inner surface of the housing groove 14.

In the case of FIG. 3, since FIG. 3 illustrates the A-A cross-section in which the projection part 120 passes through the outer body part 110, a state in which the outer projection part 120 of the body part 110 is in contact with the inner surface of the housing groove 14 is illustrated. Also, in the cross-section of another interval that is not illustrated, a protruding direction of the projection part 120 is formed differently, and at this time, the projection part 120 will also be formed in a state of being in contact with the inner surface of the housing groove 14 or the pipe 5.

In particular, since only the inner end of the total length of the projection part 120 is brought into contact with the pipe 5 in this embodiment, the contact area between the sealing member 100 and the pipe 5 is formed to be extremely small. This makes it possible to minimize occurrence of wearing due to the friction generated in accordance with the movement of the pipe 5.

In this way, although the contact area between the sealing member 100 of the present invention and the pipe 5 is minimized, since the projection part 120 is formed in a state of being generally in contact with the inner surface of the housing groove 14 or the pipe 5, it is possible to stably perform the index function.

Hereinafter, the projection part 120 of the sealing member 100 according to the present invention will be described in more detail.

FIG. 4 is a perspective view of a height corresponding to the position of the projection part 120 in the sealing member 100 according to an embodiment of the present invention, and FIG. 5 is a graph illustrating a change in the height corresponding to the position of the projection part 120, in the sealing member 100 according to the embodiment of the present invention.

As illustrated in FIG. 4, the projection part 120 may be configured so that at least height $d_3$ of the inner end protrudes higher than height $d_1$ of the outer end.

More specifically, the height from both ends to the outer end of the projection part 120 is uniformly formed in this embodiment. That is, the heights $d_2$ and $d_4$ of both ends of the projection part 120 are formed to be the same as height $d_1$ of the outer end.

Further, the projection part 120 is formed so that the projected height becomes gradually higher as it goes from both ends to the inner end.

When the outer end of the projection part 120 is defined as 0° on the basis of FIG. 4, the right end is defined as 90°, and the inner end is defined as 180° and the left end is defined as 270° along the clockwise direction, the change in the projected height is the same as the graph of FIG. 5.

That is, the projection part 120 of the sealing member 100 according to the present embodiment is formed so that there is no change in height from the outer end to the right end, the height from the right end to the inner end linearly increases, the height from the inner end to the left end linear decreases, and there is no change in height from the left end to the outer end. At this time, in the case of this embodiment, the height of the inner end of the projection part 120 is set as 1.5 mm, and the height of the both ends and the outer end is set as 0.1 mm.

However, this is merely an embodiment, and it is a matter of course that the form and change in height of the projection part 120 may be formed unlike the present embodiment. That is, the height of the projection part 120 may be variously formed, and may be achieved in various forms such that a change in height from both ends to the inner end is formed to non-linearly change.

FIG. 6 is a cross-sectional view simultaneously illustrating the state of the outer end 120a and the inner end 120b of the projection part in the sealing member according to an embodiment of the present invention.

Referring to FIG. 6, as described above, the height of the inner end 120b of the projections in this embodiment is formed to be higher than the height of the outer end 120a. The reason is to improve the index force.

Specifically, the sealing member 100 is under pressure in a state of being provided between the pipe 5 and the connector 10, whereby deformation occurs. At this time, both ends of the sealing member 100 may come into contact with the inner surface of the housing groove 14 due to deformation even at a portion in which the projection part is not formed. Therefore, a total of three points of contact P1, P2 and P3 are formed over the entire length of the sealing member 100.

That is, from the outer end to both ends of the sealing member 100, even at a point other than the projection part, contact due to deformation may occur, and the three points of contact with the inner surface of the housing groove 14 are formed in most points.

In contrast, in the case of the inner end of the sealing member 100, in a portion that is in contact with the pipe 5, only a point of contact is formed. That is, in the case of the pipe 5, since only the inner end of the sealing member 100 comes into contact with the pipe 5, it is necessary to further enhance the sealing strength than the other portions.

According to this reason, in the case of this embodiment, the height of the inner end 120b of the projection part is formed to be higher than the height of the outer end 120a to improve the index force.

FIG. 7 is a cross-sectional view illustrating a state of the projection part 124 in the sealing member 100 according to an embodiment of the present invention, and FIG. 8 is a cross-sectional view illustrating a state in which the projection part 120 is deformed by being compressed, in the sealing member 100 according to an embodiment of the present invention As illustrated in FIGS. 7 and 8, in the case of this embodiment, the outer surface of the projection part 120 is formed to have a curvature greater than the curvature of the body part.

Also, the projection part 120 includes a central center region 122, and a connecting region 124 formed on both sides of the center region 122 to connect the projection part 120 and the body part 110. At this time, the outer surface of the connecting region 124 is formed to have a curvature that is smaller than the curvature of the center region 122 and is greater than the curvature of the body part 110. That is, the average curvature of the projection part 120 is formed to be generally greater than the body part 110, and the curvature of the connecting region 124 is formed to be smaller than the curvature of the center region 122.

The reason of the projection part 120 being formed in this manner is to prevent leakage of the fluid in response to deformation due to pressure.

Referring to FIGS. 8 and 9, in the case of FIG. 8, this shows a state in which the pressure is applied in the form in which the projection part 120 includes the connecting region 124 as in this embodiment, and FIG. 9 shows a state in which the pressure applied in a state in which the projection part 120 does not include the connecting region 124.

In the case of FIG. 8, it is possible to check that the projection part 120 and the body part 110 form a generally natural curve despite of deformation due to the pressure. In contrast, in the case of FIG. 9, it is possible to check that recessed grooves g are formed between the projection part 120 and the body part 110 at the time of deformation due to the pressure, and there is a problem of leakage of fluid through the recessed grooves.

That is, in the case of this embodiment, as described above, by forming the connection region 124 that is smaller than the curvature of the center region 122 and is greater than the curvature of the body part 110, it is possible to prevent leakage of fluid to due to the shape deformation.

While the invention has been illustrated and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A pipe connecting sealing member comprising:
   a body part comprising a ring that forms a continuous loop extending in a circumferential direction, wherein the body part is provided between an outer surface of a pipe and an inner surface of a connector to which the pipe is inserted; and
   a projection part protruding from a surface of the body part in a continuous helical spiral shape that projects along the surface of the body part in the circumferential direction, wherein an inner portion of the projection part that extends from an inner surface portion of the body part and is in contact with the pipe protrudes higher from the surface of the body part than an outer portion of the projection part that extends from an inner surface portion of the body part and is in contact with the inner surface of the connector such that a sealing strength of the inner portion of the projection part in contact with the pipe is greater than a sealing strength of the outer portion of the projection part in contact with the connector.

2. The pipe connecting sealing member of claim 1, wherein a cross-section of the body part is formed in a circular shape.

3. The pipe connecting sealing member of claim 1, wherein the projection part is formed so that a projection height of the projection part gradually increases from opposing side surface portions of the body part to the inner surface portion of the body part.

4. The pipe connecting sealing member of claim 1, wherein the projection part is formed so that a projection height of the projection part is uniform from opposing side surface portions of the body part to an outer surface portion of the body part.

5. The pipe connecting sealing member of claim 1, wherein an outer surface of the projection part is formed to have a curvature greater than that of the surface of the body part.

6. The pipe connecting sealing member of claim 5, wherein the projection part comprises a central center region, and a connecting region is formed on both sides of the center region to connect the projection part and the body part.

7. The pipe connecting sealing member of claim 6, wherein an outer surface of the connecting region is formed to have a curvature that is smaller than a curvature of an outer surface of the center region and is greater than a curvature of the surface of the body part.

8. The pipe connecting sealing member of claim 1, wherein the body part comprises a toroid.

9. The pipe connecting sealing member of claim 1, wherein the body part comprises a torus.

10. The pipe connecting sealing member of claim 1, wherein the projection part is integrally connected to the surface of the body part and extends in the helical spiral shape along an entire circumference of the body part.

11. The pipe connecting sealing member of claim 1, wherein the projection part is structurally configured such that the body part need not contact the outer surface of the pipe.

12. The pipe connecting sealing member of claim 1, wherein contact between the pipe and the sealing member is limited to the projection part.

13. The pipe connecting sealing member of claim 1, wherein contact between the connector and the sealing member is limited to the projection part.

14. The pipe connecting sealing member of claim 1, wherein contact between the pipe and the sealing member is limited to the projection part and contact between the connector and the sealing member is limited to the projection part.

* * * * *